United States Patent
Zhao et al.

(10) Patent No.: US 10,675,812 B2
(45) Date of Patent: Jun. 9, 2020

(54) THREE-DIMENSIONAL (3D) PRINTING

(71) Applicant: Hewlett-Packard Development Company, L.P., Houston, TX (US)

(72) Inventors: Lihua Zhao, Sunnyvale, CA (US); Yan Zhao, Palo Alto, CA (US); Hou T. Ng, Campbell, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 332 days.

(21) Appl. No.: 15/545,931

(22) PCT Filed: Apr. 30, 2015

(86) PCT No.: PCT/US2015/028421
§ 371 (c)(1),
(2) Date: Jul. 24, 2017

(87) PCT Pub. No.: WO2016/175817
PCT Pub. Date: Nov. 3, 2016

(65) Prior Publication Data
US 2018/0015663 A1    Jan. 18, 2018

(51) Int. Cl.
*B29C 64/165* (2017.01)
*B33Y 30/00* (2015.01)
*B33Y 10/00* (2015.01)
*B22F 3/105* (2006.01)
*B33Y 50/02* (2015.01)
(Continued)

(52) U.S. Cl.
CPC .......... *B29C 64/165* (2017.08); *B22F 3/1055* (2013.01); *B29C 64/291* (2017.08); *B29C 64/393* (2017.08); *B33Y 10/00* (2014.12); *B33Y 30/00* (2014.12); *B33Y 50/02* (2014.12); *B22F 2003/1056* (2013.01); *B22F 2003/1057* (2013.01); *Y02P 10/295* (2015.11)

(58) Field of Classification Search
CPC ... B29C 64/165; B29C 64/393; B29C 64/291; B33Y 10/00; B33Y 30/00; B33Y 50/02; B22F 3/1055; B22F 2003/1056; B22F 2003/1057; Y02P 10/295
USPC .......................................... 264/460; 425/375
See application file for complete search history.

(56) References Cited

U.S. PATENT DOCUMENTS 5,980,812 A    11/1999  Lawton
7,291,364 B2   11/2007  Faulkner et al.
(Continued)

FOREIGN PATENT DOCUMENTS

WO    WO 2007/114895    10/2007

OTHER PUBLICATIONS

"HP outlines 3D Multi Jet Fusion technology for future 3D printers", (2014), 3 pages, http://www.electronista.com.
(Continued)

*Primary Examiner* — Joseph S Del Sole
*Assistant Examiner* — Lawrence D. Hohenbrink, Jr.
(74) *Attorney, Agent, or Firm* — Dierker & Kavanaugh PC

(57) ABSTRACT

In an example implementation, a method of three-dimensional (3D) printing includes applying a sinterable material, selectively applying a fusing agent on a portion of the sinterable material, applying a first amount of radiation energy to the portion of the sinterable material, and applying a second amount of radiation energy to the portion of the sinterable material different than the first amount of radiation energy.

15 Claims, 6 Drawing Sheets

(51) Int. Cl.
*B29C 64/393* (2017.01)
*B29C 64/291* (2017.01)

(56) References Cited

U.S. PATENT DOCUMENTS

| | | |
|---|---|---|
| 8,784,720 B2 | 7/2014 | Oberhofer et al. |
| 9,643,359 B2* | 5/2017 | Baumann ............... B33Y 10/00 |
| 2006/0180957 A1 | 8/2006 | Hopkinson et al. |
| 2006/0290032 A1 | 12/2006 | Sano |
| 2007/0238056 A1 | 10/2007 | Baumann et al. |
| 2007/0241482 A1* | 10/2007 | Giller ................... B29C 64/165 |
| | | 264/494 |
| 2010/0270708 A1 | 10/2010 | Jonasson et al. |
| 2014/0134334 A1 | 5/2014 | Pridoehl et al. |
| 2014/0257549 A1 | 9/2014 | Swartz et al. |
| 2014/0314613 A1* | 10/2014 | Hopkinson ........... B22F 3/1055 |
| | | 419/55 |

OTHER PUBLICATIONS

International Search Report and Written Opinion for International Application No. PCT/US2015/028421 dated Jan. 11, 2016, 14 pages.

* cited by examiner

THREE-DIMENSIONAL (3D) PRINTING

BACKGROUND

Three-dimensional (3D) printing is an additive manufacturing process in which successive layers of material are laid down to form three-dimensional objects from a digital model. In additive manufacturing, successive material layers are joined together by fusing, binding, or solidification through processes including sintering, extrusion, and irradiation. The quality, strength, and functionality of objects produced by such systems can vary depending on the type of additive manufacturing technology used. Typically, lower quality and lower strength objects can be produced using lower cost systems, while higher quality and higher strength objects can be produced using higher cost systems.

BRIEF DESCRIPTION OF THE DRAWINGS

Examples will now be described with reference to the accompanying drawings, in which.

Throughout the drawings, identical reference numbers designate similar, but not necessarily identical, elements.

DETAILED DESCRIPTION

Figure 1:
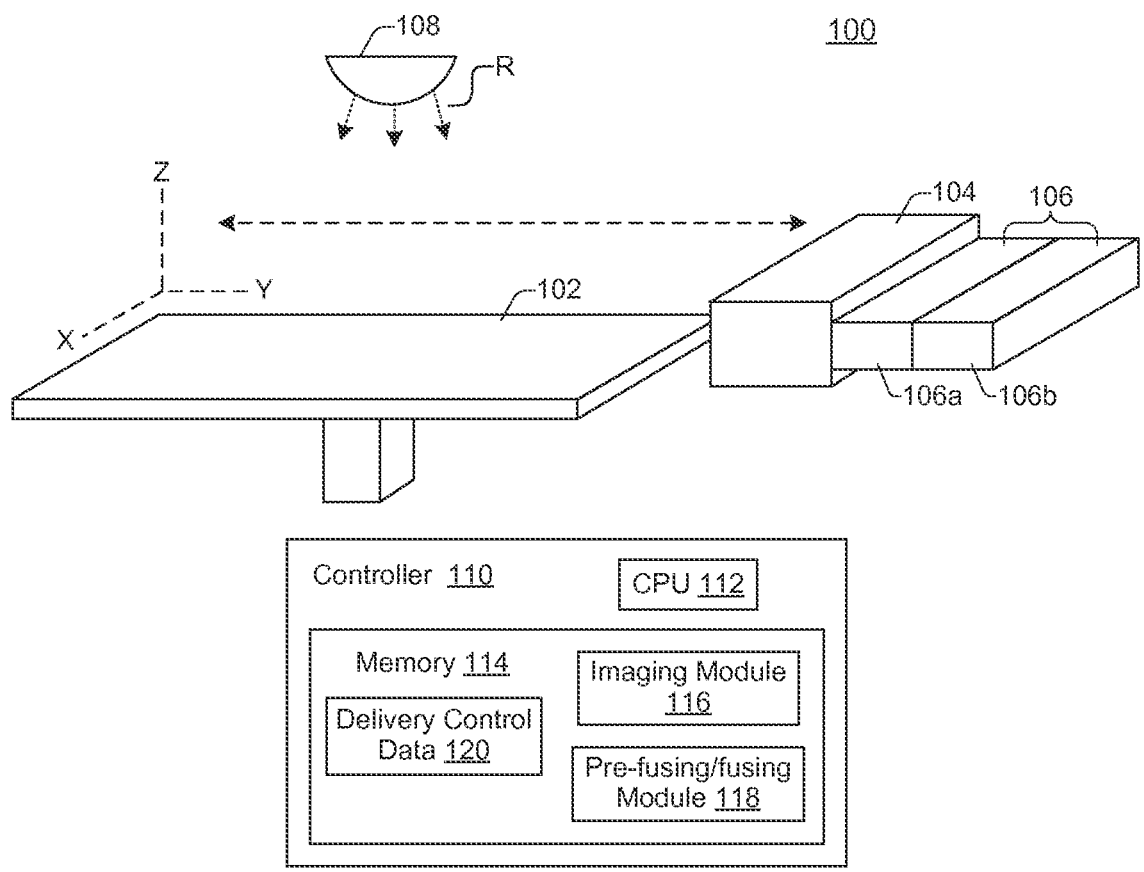
FIG. 1 shows an example of a three-dimensional (3D) printing system for manufacturing 3D objects including color functional parts that have improved mechanical strength and densities comparable to that of black parts.

In some examples of three-dimensional (3D) printing, 3D objects are formed using light area processing technology. During light area processing, an entire layer of a build material, such as a sinterable material is exposed to radiation. A selected region of the sinterable build material is fused (i.e., coalesced) and subsequently solidified or hardened to become a layer of a 3D object. In some examples, a coalescent or fusing agent is selectively deposited in contact with the selected region of the sinterable material. The fusing agent is capable of penetrating into the layer of the sinterable material and spreading onto the exterior surface of the sinterable material. The fusing agent is capable of absorbing radiation and converting the absorbed radiation to thermal energy, which in turn melts or sinters the sinterable material that is in contact with the fusing agent. This causes the sinterable material to fuse, bind, cure, etc., to form the layer of the 3D object. Repeating this process with numerous layers of the sinterable material causes the layers to be joined together, resulting in formation of the 3D object.

Higher density 3D parts having improved mechanical strength and functionality can be produced when a greater amount of thermal energy is applied to the sinterable material for sintering and fusing the layers together. However, the amount of thermal energy available for sintering depends in part on the intensity with which the fusing agent absorbs the radiation, and the radiation absorptivity of the fusing agent depends in part on the color of the fusing agent. For example, the absorption intensity of near-infrared dye-based fusing agent with cyan, magenta, or yellow (C, M, or Y) color dye is generally lower than that of carbon black-based fusing agent. Therefore, the level of fusing of the sinterable material is lower for 3D printed color parts than it is for 3D printed black parts, which may result in color parts having lower densities and less mechanical strength and functionality than comparable black parts. In some examples, the mechanical strength of color functional parts produced with near infra-red plus color dyes is 60% to 80% less than similar black functional parts.

Examples of three-dimensional (3D) printing disclosed herein enable the production of 3D color functional parts having higher densities and improved mechanical strength that are comparable to that of 3D black parts. In general, a pre-fusing operation is applied to a 3D object layer of sinterable material (e.g., powder) that comprises a color image area (i.e., a color cross section of the 3D object) on which colored fusing agent has been selectively deposited. The pre-fusing operation includes a shortened exposure to radiation of the 3D object layer. Greater absorption of the radiation within the color image area generates additional heat that increases the temperature of the sinterable material within the color image area. The pre-fusing operation is then followed by a fusing operation that provides a longer radiation exposure to the 3D object layer which fuses the sinterable material within the color image area and results in improved interlayer adhesion.

In one example, a method of three-dimensional (3D) printing includes applying a sinterable material, selectively applying a fusing agent on a portion of the sinterable material, applying a first amount of radiation energy to the portion of the sinterable material, and applying a second amount of radiation energy to the portion of the sinterable material different than the first amount of radiation energy.

In another example, a system for 3D printing includes a support for sinterable material. The system includes a sinterable material distributor to provide a layer of sinterable material on the support, and a fusing agent distributor to selectively deliver a fusing agent onto a portion of the layer of sinterable material. The system includes a radiation source and a pre-fusing/fusing module to control the radiation source to apply a first amount of radiation energy to the layer of sinterable material during a first pre-fusing operation and to apply a second amount of radiation energy to the layer of sinterable material during a fusing stage In another example, a non-transitory machine-readable storage medium stores instructions that when executed by a processor of a 3D printing device, cause the 3D printing device to deposit a sinterable material onto a fabrication bed to form a 3D object layer, heat the sinterable material to a temperature ranging from about 50° C. to about 400° C., deposit a fusing agent onto a portion of the sinterable material according to an image pattern of a cross-section of the 3D object layer, expose the sinterable material to radiation for a first duration in a pre-fusing stage, and expose the sinterable material to radiation for a second duration in a fusing stage, wherein the second duration is longer than the first duration.

FIG. 1 illustrates an example of a 3D printing system 100 for manufacturing 3D objects including color functional parts that have improved mechanical strength and densities that are comparable to that of black parts. The 3D printing system of FIG. 1 includes a support member 102 that functions as a fabrication bed to receive and hold sinterable material (not shown in FIG. 1) for forming a 3D object. In an example, the support member 102 has dimensions ranging from about 10 cm by 10 cm up to about 100 cm by 100 cm, although the support member 102 may have larger or smaller dimensions depending upon the 3D object that is to be formed.

A sinterable material distributor 104 provides a layer of sinterable material onto the support member 102. Examples of suitable sinterable material distributors include a wiper blade, a roller, and combinations thereof. In some examples, a sinterable material distributor 104 may comprise a supply bed and fabrication piston to push sinterable material onto the support member 102 as further described herein below. Sinterable material can be supplied to the sinterable material distributor 104 from a hopper or other suitable delivery system. In the example system 100 shown in FIG. 1, the sinterable material distributor 104 moves across the length (Y axis) of the support member 102 to deposit a layer of the sinterable material.

As described below, a first layer of sinterable material is deposited on the support member 102, followed by the deposition of subsequent layers of sinterable material onto previously deposited (and solidified) layers. Accordingly, support member 102 may be moveable along the Z axis such that when new layers of sinterable material are deposited, a predetermined gap is maintained between the surface of the most recently formed layer and the lower surface of an agent distributor 106, illustrated as fusing agent distributor 106a and detailing agent distributor 106b. In other examples, the support member 102 may be fixed along the Z axis and the agent distributor 106 may be movable along the Z axis to maintain such predetermined gap.

An agent distributor 106 delivers a fusing agent and/or a detailing agent via fusing agent distributor 106a and detailing agent distributor 106b, respectively, in a selective manner onto portions of a layer of sinterable material provided on support member 102. For example, the fusing agent distributor 106a may deliver a fusing agent to selective portions of a layer of sinterable material while the detailing agent distributor 106b may deliver a detailing agent to the same portions and/or to other portions of the layer of sinterable material provided on the support member 102. Agent distributors 106a and 106b may include, respectively, a supply of fusing agent and detailing agent, or they may be operatively connected, respectively, to a separate supply of the fusing agent and detailing agent.

While other types of agent distributors are possible and are contemplated herein, the agent distributor 106 (i.e., 106a, 106b) shown in the example 3D printing system 100 of FIG. 1 comprises one or multiple printheads, such as thermal inkjet printheads or piezoelectric inkjet printheads. The printheads 106a and 106b may be drop-on-demand printheads or continuous drop printheads. The printheads 106a and 106b may be used to selectively deliver a fusing agent and a detailing agent, respectively, when such agents are in the form of a suitable fluid. In other examples of a printing system 100, a single printhead 106 may be used to selectively deliver both the fusing agent and the detailing agent. In such an example, a first set of printhead nozzles on the single printhead 106 can deliver the fusing agent, and a second set of printhead nozzles on the single printhead 106 can deliver the detailing agent. As described below, each of the fusing agent and the detailing agent includes an aqueous vehicle, such as water, co-solvent(s), surfactant(s), etc., to enable it to be delivered via the printheads 106a and 106b.

Each printhead 106 can include an array of nozzles through which they can selectively eject drops of fluid. In one example, each drop may be on the order of about 10 pico liters (pl) per drop, although it is contemplated that a higher or lower drop size may be used. In some examples, printheads 106a and 106b can deliver variable size drops. In one example, the printheads 106a and 106b can deliver drops of the fusing agent and the detailing agent at a resolution ranging from about 300 dots per inch (DPI) to about 1200 DPI. In other examples, the printheads 106a and 106b can deliver drops of the fusing agent and the detailing agent at a higher or lower resolution. The drop velocity may range from about 5 m/s to about 24 m/s and the firing frequency may range from about 1 kHz to about 100 kHz.

The printheads 106a and 106b may be an integral part of the printing system 100, or they may be user replaceable. When the printheads 106a and 106b are user replaceable, they may be removably insertable into a suitable distributor receiver or interface module (not shown).

As shown in FIG. 1, each of the agent distributors 106a and 106b has a length that enables it to span the whole width of the support member 102 in a page-wide array configuration. In an example, the page-wide array configuration is achieved through a suitable arrangement of multiple printheads. In another example, the page-wide array configuration is achieved through a single printhead with an array of nozzles having a length to enable them to span the width of the support member 102. In still other examples of the printing system 100, the agent distributors 106a and 106b may have a shorter length that does not enable them to span the whole width of the support member 102.

In some examples, agent distributors 106a and 106b are mounted on a moveable carriage to enable them to move bi-directionally across the length of the support member 102 along the illustrated Y axis. This enables selective delivery of the fusing agent and detailing agent across the whole width and length of the support member 102 in a single pass. In other examples, the support member 102 can move relative to the agent distributors 106a and 106b as they remain in a fixed position.

As used herein, the term 'width' generally denotes the shortest dimension in the plane parallel to the X and Y axes shown in FIG. 1, and the term 'length' denotes the longest dimension in this plane. However, in other examples the term 'width' may be interchangeable with the term 'length'. As an example, an agent distributor 106 may have a length that enables it to span the whole length of the support member 102 while the moveable carriage may move bi-directionally across the width of the support member 102.

In examples in which the agent distributors 106a and 106b have a shorter length that does not enable them to span the whole width of the support member 102, the distributors 106a and 106b may also be movable bi-directionally across the width of the support member 102 in the illustrated X axis. This configuration enables selective delivery of the fusing agent and detailing agent across the whole width and length of the support member 102 using multiple passes.

As shown in FIG. 1, the 3D printing system 100 includes a radiation source 108 to emit radiation R. Radiation source 108 can be implemented in a variety of ways including, for example, as an IR, near-IR, UV, or visible curing lamp, IR, near-IR, UV, or visible light emitting diodes (LED), or lasers with specific wavelengths. The radiation source 108 used depends, at least in part, on the type of fusing agent that is used. The radiation source 108 may be attached, for example, to a carriage (not shown) that also holds the printhead(s) 106. The carriage may move the radiation source 108 into a position that is adjacent to the support member 102. In different examples, the radiation source 108 is to apply energy to a deposited layer of sinterable material, the fusing agent, and the detailing agent, to cause the solidification of portions of the sinterable material. In one example, the radiation source 108 is a single energy source that is able to uniformly apply energy to the materials deposited onto support member 102. In another example, radiation source 108 includes an array of energy sources to uniformly apply energy to the deposited materials.

In some examples, the radiation source 108 can apply energy in a substantially uniform manner to the whole surface of the layer of sinterable material deposited onto the support member 102. This type of radiation source 108 may be referred to as an unfocused energy source. Exposing the entire layer of sinterable material to energy simultaneously may help increase the speed at which a three-dimensional object is generated.

As shown in FIG. 1, the 3D printing system 100 includes a controller 110. The example controller 110 shown in FIG. 1 is suitable for controlling the printing system 100 to implement pre-fusing and fusing operations described herein to enable the production of 3D color functional parts having higher densities and improved mechanical strength that are comparable to that of 3D black parts. Controller 110 generally comprises a processor (CPU) 112 and a memory 114, and may additionally include firmware and other electronics for communicating with and controlling the various components of 3D printing system 100.

Memory 114 can include both volatile (i.e., RAM) and nonvolatile memory components (e.g., ROM, hard disk, optical disc, CD-ROM, magnetic tape, flash memory, etc.). The components of memory 114 comprise non-transitory, machine-readable (e.g., computer/processor-readable) media that provide for the storage of machine-readable coded program instructions, data structures, program instruction modules, JDF (job definition format), and other data and/or instructions executable by a processor 112 of 3D printing system 100. An example of instructions stored in memory 114 include instructions associated with modules 116 and 118, while an example of stored data includes delivery control data 120. Modules 116 and 118 can include programming instructions executable by a processor 112 to cause a 3D printing system 100 to perform various general and/or specific functions such as the operations of methods 300 and 400, as described below with respect to FIGS. 3 and 4, respectively.

The program instructions, data structures, modules, etc., stored in memory 114 may be part of an installation package that can be executed by processor 112 to implement various examples, such as examples discussed herein. Thus, memory 114 may be a portable medium such as a CD, DVD, or flash drive, or a memory maintained by a server from which the installation package can be downloaded and installed. In another example, the program instructions, data structures, modules, etc., stored in memory 114 may be part of an application or applications already installed, in which case memory 114 may include integrated memory such as a hard drive.

As noted above, controller 110 controls the 3D printing system 100 to implement pre-fusing and fusing operations to enable the production of 3D color functional parts that have higher densities and improved mechanical strength comparable to that of 3D black parts. In some examples, controller 110 uses delivery control data 120 and programming instructions from memory 114 (e.g., instructions in modules 116, 118), to manage the application of sinterable material, fusing and detailing agents, and radiation within the printing system 100 to facilitate the production of the 3D parts. More specifically, controller 110 receives delivery control data 120 from a host system, such as a computer, and stores the data 120 in memory 114. Data 120 represents, for example, object files defining 3D objects to be printed, associated agent delivery data to control the selective delivery of fusing agents and detailing agents onto layers of sinterable material, and associated radiation source control data to control the amount of radiation energy applied and the manner in which radiation is applied to layers of sinterable material by radiation source 108. Thus, data 120 forms one or more 3D print jobs for printing system 100 that each include print job commands and/or command parameters. Using a print job from data 120, processor 112 in controller 110 executes instructions (e.g., from modules 116, 118) to control components of printing system 100 (e.g., support member 102, sinterable material distributor 104, agent distributor 106, radiation source 108) to form 3D objects, one layer at a time, through a 3D printing process described in greater detail herein below.

Imaging module 116 comprises programming instructions executable to control the application of layers of sinterable material onto the support member 102 in accordance with delivery control data 120. Instructions from imaging module 116 are further executable to control the application of fusing agent onto selective portions of the sinterable material layers that define cross sections of the 3D object in accordance with delivery control data 120. For example, executing instructions from imaging module 116, controller 110 can cause a printhead 106*a* to jet fusing agent in a liquid form onto selected portions of a layer of sinterable material in accordance with delivery control data 120. In some examples, instructions from imaging module 116 further execute to control the application of a detailing agent onto the sinterable material layers. For example, executing instructions from imaging module 116, controller 110 can cause a printhead 106*b* to jet (i.e., eject) detailing agent in a liquid form onto selected other portions and/or the same portions of the layer of sinterable material in accordance with delivery control data 120.

The pre-fusing/fusing module 118 comprises programming instructions executable to control the application of energy from a radiation source 108 to each layer of sinterable material after the fusing agent (and in some cases, the detailing agent) has been jetted onto the sinterable material. In a first pre-fusing operation, a first amount of radiation energy is applied to the layer of sinterable material. In some examples, radiation energy is applied in a fast sweep of the radiation source 108 across the sinterable material layer to raise the temperature of the "just-imaged" area of the layer (i.e., the area that has just received the fusing agent) up to or slightly higher than that of the surrounding sinterable material. In a second fusing operation, a second amount of radiation energy is applied to the layer of sinterable material. In some examples, this includes applying radiation energy in a slow sweep of the radiation source 108 across the sinterable material layer to raise the temperature of the just-imaged area to a much higher temperature that thoroughly fuses the just-imaged area of the layer.

Figure 2:
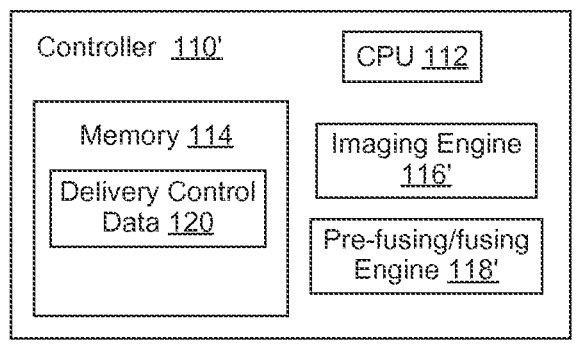
FIG. 2 shows an example controller of a 3D printing system that includes engines to perform functions of the 3D printing system such as imaging and pre-fusing/fusing functions.

In other examples of a 3D printing system 100, the functionalities of modules 116 and 118 may be implemented as respective engines (e.g., an imaging engine and a pre-fusing/fusing engine) of the 3D printing system 100, each engine comprising any combination of hardware and programming to implement the functionalities of the engines, as described below. Thus, as shown in FIG. 2, a controller 110' of a 3D printing system 100 can include imaging engine 116' and pre-fusing/fusing engine 118'. Engines 116' and 118' can include, for example, various combinations of hardware and programming to perform a designated function such as the operations in methods 300 and 400, described below with respect to FIGS. 3 and 4, respectively. Hardware for each engine 116' and 118' can include, for example, discrete electronic components, an ASIC (application specific integrated circuit), a processor and a memory, while the programming instructions may be stored on the engine memory and/or a memory 114 and be executable by a processor to perform the designated function.

Figure 3:
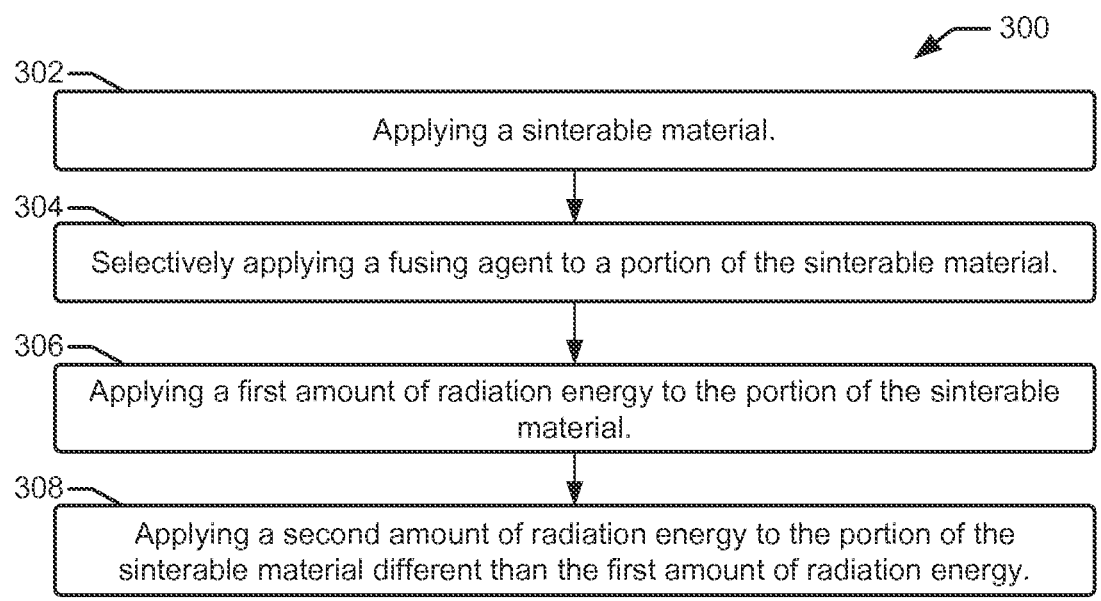
FIGS. 3, 4 and 5 show flow diagrams that illustrate example methods related to the production of 3D color functional parts in a 3D printing system.
Figure 4:
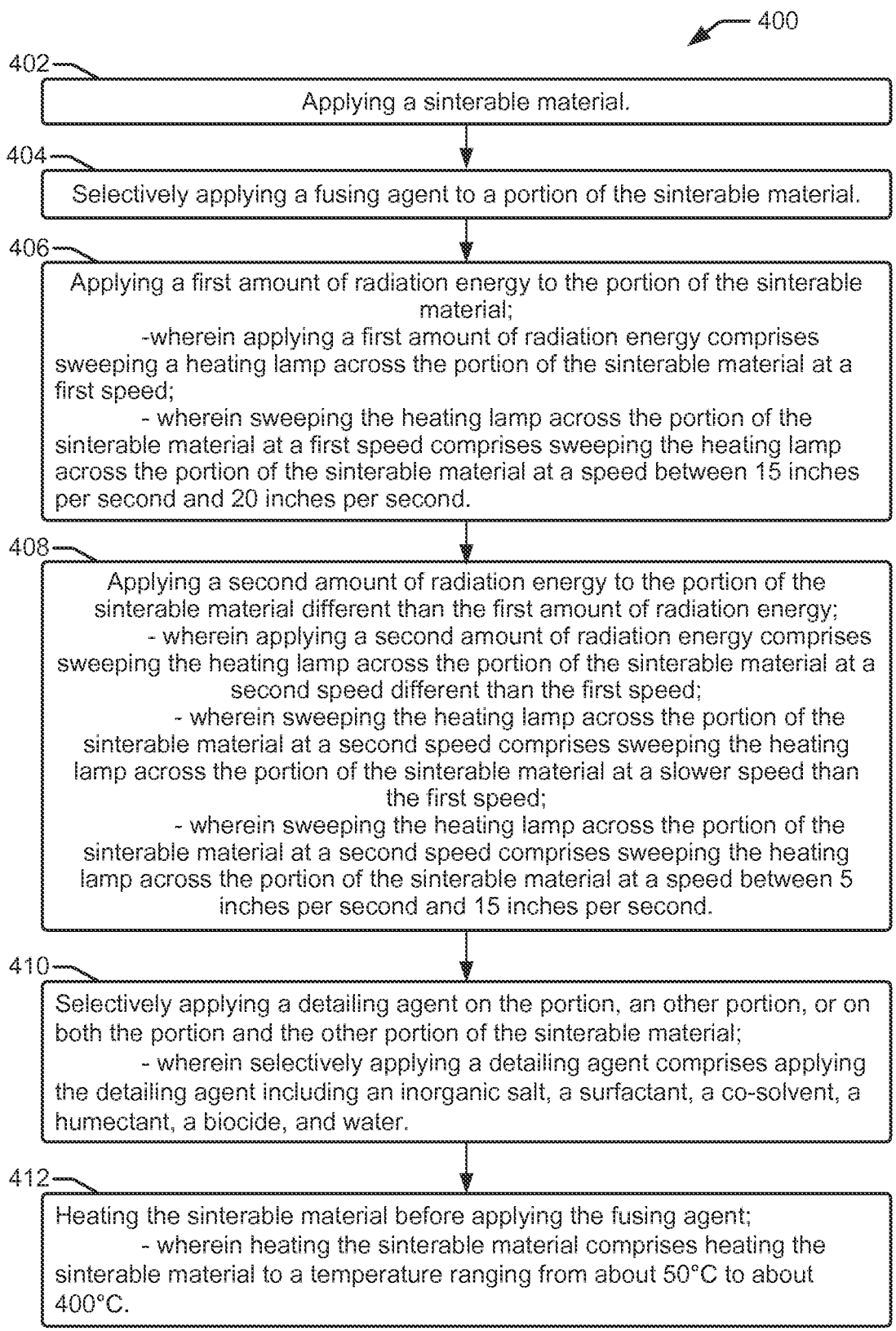
Figure 5:
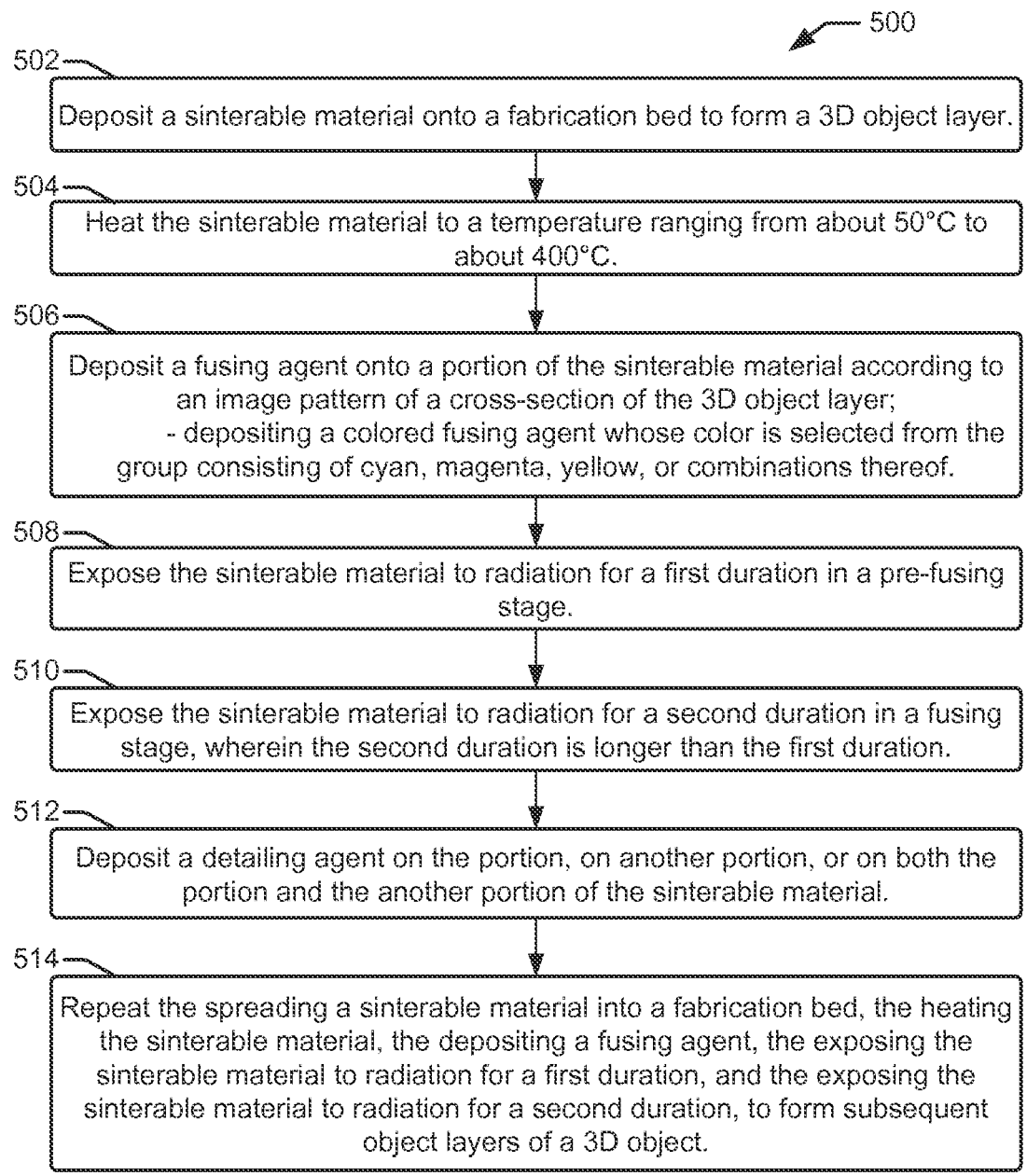

FIGS. 3, 4 and 5 show flow diagrams that illustrate example methods 300, 400 and 500, respectively, related to the production of 3D color functional parts in a 3D printing system such as 3D printing system 100. Methods 300-500 are associated with the examples discussed herein with regard to FIGS. 1-2, and FIGS. 6a-6f (discussed below), and details of the operations shown in these methods can be found in the related discussion of such examples. The operations of methods 300-500 may be embodied as programming instructions stored on a non-transitory, machine-readable (e.g., computer/processor-readable) medium, such as the memory 114 shown in FIG. 1. In some examples, implementing the operations of methods 300-500 can be achieved by a processor, such as a processor 112 shown in FIG. 1, reading and executing programming instructions such as instructions from modules 116 and 118 stored in memory 114. In some examples, implementing the operations of methods 300-500 can be achieved using engines of a 3D printing system that include combinations of hardware such as an ASIC (application specific integrated circuit) and/or other hardware components, alone or in combination with programming instructions executable by a processor.

In some examples, methods 300-500 may include more than one implementation, and different implementations of methods 300-500 may not employ every operation presented in the respective flow diagrams of FIGS. 3-5. Therefore, while the operations of methods 300-500 are presented in a particular order within the flow diagrams, the order of their presentation is not intended to be a limitation as to the order in which the operations may actually be implemented, or as to whether all of the operations may be implemented. For example, one implementation of method 400 might be achieved through the performance of a number of initial operations, without performing one or more subsequent operations, while another implementation of method 400 might be achieved through the performance of all of the operations.

Referring now to the flow diagram of FIG. 3, an example method 300 of three-dimensional (3D) printing begins at block 302, with applying a build material such as sinterable material. Applying a sinterable build material can include, for example, depositing, accumulating, laying down, building up, or otherwise putting a layer of sinterable material onto a support member or fabrication bed of a 3D printing system. One example of applying sinterable material includes the use of a sinterable material distributor such as a supply bed to push sinterable material onto the support member, as discussed below with reference to FIGS. 6a-6f.

As shown at block 304, method 300 can continue with selectively applying a fusing agent to a portion of the sinterable material layer. Selectively applying a fusing agent to a portion of the sinterable material can include dispensing the fusing agent from a fusing agent distributor such as an inkjet printhead onto the sinterable material in a pattern that defines a cross section of a 3D object in accordance with delivery control data. In some examples, the fusing agent is a color fusing agent that defines a color image area cross section of the 3D object.

As shown at block 306, method 300 can continue with applying a first amount of radiation energy to the portion of the sinterable material. Applying a first amount of radiation energy to the portion of the sinterable material comprises a pre-fusing operation that generates heat and increases the temperature of the sinterable material within the color image area. Such a pre-fusing operation can then be followed by a fusing operation that includes applying a second amount of radiation energy to the portion of the sinterable material different than the first amount of radiation energy, as shown at block 308. The fusing operation can provide a second amount of radiation energy that is greater than the first amount of radiation energy to fuse the sinterable material within the color image area.

Referring now to the flow diagram of FIG. 4, an example method 400 of 3D printing will be discussed in which operations are included that are in addition to, or are an alternative to, some of the operations of method 300. Method 400 begins at block 402, with applying a sinterable material. As discussed above, applying a sinterable material can include various manners of depositing a layer of sinterable material onto a support member or fabrication bed of a 3D printing system, such as using a sinterable material distributor to push sinterable material onto the support member. The method 400 continues at block 404 with selectively applying a fusing agent to a portion of the sinterable material layer, which can include, for example, dispensing the fusing agent from a fusing agent distributor such as an inkjet printhead onto the sinterable material in a pattern that defines a cross section of a 3D object in accordance with delivery control data. In some examples, the fusing agent is a color fusing agent that defines a color image area cross section of the 3D object.

As shown at block 406, the method 400 can continue with applying a first amount of radiation energy to the portion of the sinterable material in a pre-fusing operation that generates heat and increases the temperature of the sinterable material within the color image area. In some examples, applying a first amount of radiation energy comprises sweeping a heating lamp across the portion of the sinterable material at a first speed. In method 400, sweeping the heating lamp across the portion of the sinterable material at a first speed may comprise sweeping the heating lamp across the portion of the sinterable material, for example, at a speed between 15 inches per second and 20 inches per second.

The method 400 can then continue with applying a second amount of radiation energy to the portion of the sinterable material different than the first amount of radiation energy, in a fusing operation as shown at block 408. In some examples, applying a second amount of radiation energy comprises sweeping the heating lamp across the portion of the sinterable material at a second speed that is different than the first speed. In method 400, sweeping the heating lamp across the portion of the sinterable material at a second speed may comprise sweeping the heating lamp across the portion of the sinterable material at a slower speed than the first speed. In some examples, sweeping the heating lamp across the portion of the sinterable material at a second speed comprises sweeping the heating lamp across the portion of the sinterable material at a speed between 5 inches per second and 15 inches per second.

As shown at block 410, method 400 can include selectively applying a detailing agent on the same portion, on another portion, or on both the portion and the other portion of the sinterable material. In some examples, selectively applying a detailing agent comprises applying the detailing agent including an inorganic salt, a surfactant, a co-solvent, a humectant, a biocide, and water.

As shown at block 412 of method 400, in some examples, before applying the fusing agent as shown in block 404, the sinterable material can be heated. In some examples, heating the sinterable material can include heating the sinterable material to a temperature ranging from about 50° C. to about 400° C.

Referring now to the flow diagram of FIG. 5, an example method 500 related to 3D printing begins at block 502, with depositing a sinterable material onto a fabrication bed to form a 3D object layer. At block 504 the method continues with heating the sinterable material to a temperature ranging from about 50° C. to about 400° C. A fusing agent is then deposited onto a portion of the sinterable material according to an image pattern of a cross-section of the 3D object layer, as shown at block 506. Depositing the fusing agent can include depositing a colored fusing agent whose color is selected from the group of colors including cyan, magenta, yellow, and combinations thereof.

The method 500 continues at block 508 with exposing the sinterable material to radiation for a first duration in a pre-fusing stage. At block 510, the sinterable material is then exposed to radiation for a second duration in a fusing stage. The second duration is longer than the first duration. A detailing agent is then deposited on the portion, on another portion, or on both the portion and the another portion of the sinterable material, as shown at block 512. Then, as shown at block 514, the method 500 continues with repeating the operations of spreading a sinterable material into a fabrication bed, heating the sinterable material, depositing a fusing agent, exposing the sinterable material to radiation for a first duration, and exposing the sinterable material to radiation for a second duration, in order to form subsequent object layers of a 3D object.

Referring now to FIG. 6 (FIGS. 6a-6f), another example of the 3D printing system 100' is depicted. The system 100' includes a supply bed 122, a delivery piston 126, a roller 128, a fabrication bed 130 (having a contact surface 132), and a fabrication piston 134. The supply/delivery bed 122 includes a supply of build material such as sinterable material 124. Each of the physical elements of system 100' may be operatively connected to a controller (not shown), such as a controller 110 of printing system 100 shown in FIG. 1. A processor executing programming instructions stored in a non-transitory, tangible computer-readable storage medium manipulates and transforms data represented as physical (electronic) quantities within the printer's registers and memories in order to control the physical elements to create a 3D object. The data for the selective delivery of the sinterable material 124, the fusing coalescent agent, etc., may be derived from a model of the 3D object to be formed.

The delivery piston 126 and the fabrication piston 134 may be the same type of piston, but can be controlled to move in opposite directions (e.g., by a controller 110, FIG. 1). In an example, when a first layer of a 3D object is to be formed, the delivery piston 126 may be controlled to push a predetermined amount of the sinterable material 124 out of the opening in the supply bed 122 and the fabrication piston 134 may be controlled to move in the opposite direction of the delivery piston 126 in order to increase the depth of the fabrication bed 130. The delivery piston 126 will advance enough so that when the roller 128 pushes the sinterable material 124 into the fabrication bed 130 and onto the contact surface 132, the depth of the fabrication bed 130 is sufficient so that a layer 136 of the sinterable material 124 may be formed in the bed 130. The roller 128 is capable of spreading the sinterable material 124 into the fabrication bed 130 to form the layer 136, which is relatively uniform in thickness. In an example, the thickness of the layer 136 ranges from about 90 μm to about 110 μm, although thinner or thicker layers may also be used. Tools other than a roller 128 may be used to spread the sinterable material 124, such as a blade that may be desirable for spreading different types of powders, or a combination of a roller and a blade.

Figure 6A:
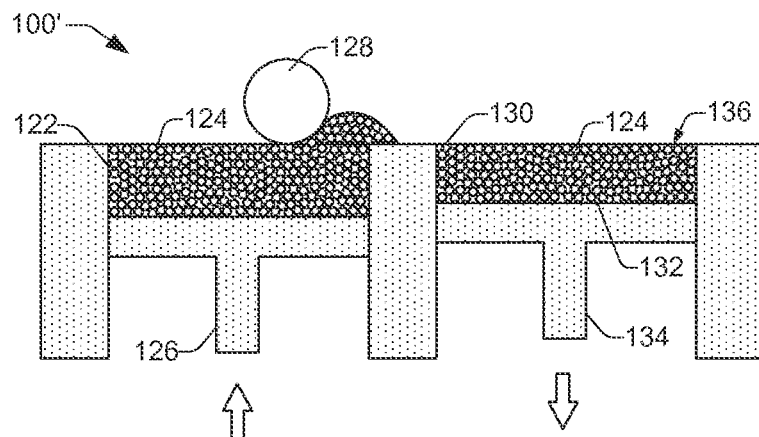
FIGS. 6a-6f shows another example of a 3D printing system for manufacturing 3D objects.
Figure 6B:
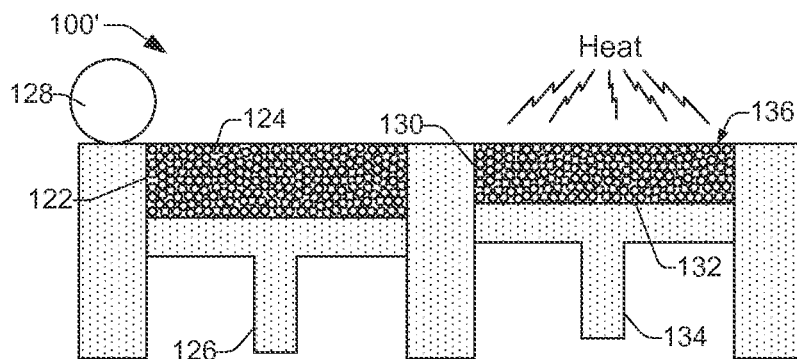

After a layer 136 of the sinterable material 124 is deposited in the fabrication bed 130, the layer 136 can be exposed to heating, as shown in FIG. 6b. Heating can be performed to pre-heat the sinterable material 124 to a temperature below the melting point of the sinterable material 124. As such, the temperature selected will depend upon the sinterable material 124 that is used. As examples, the heating temperature may be from about 5° C. to about 50° C. below the melting point of the sinterable material. In an example, the heating temperature ranges from about 50° C. to about 400° C. In another example, the heating temperature ranges from about 150° C. to about 170° C. Pre-heating the layer 136 of the sinterable material 124 may be accomplished using any suitable heat source that exposes all of the sinterable material 124 in the fabrication bed 130 to the heat. Examples of the heat source include a thermal heat source or a light radiation source.

Figure 6C:
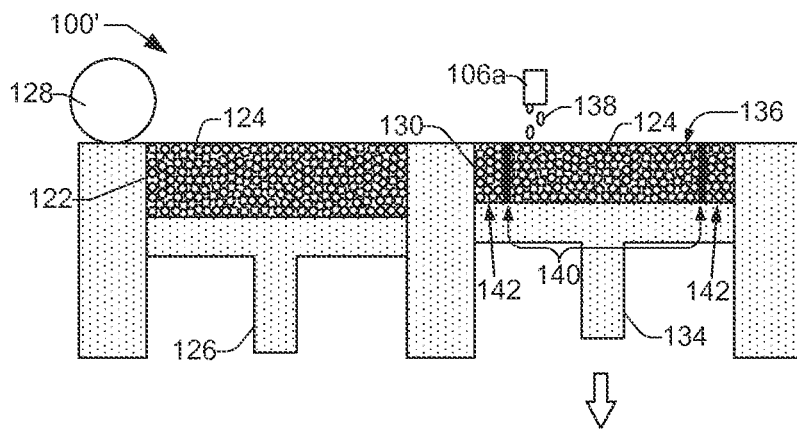

After pre-heating the layer 136, a fusing agent 138 is selectively applied on a portion of the sinterable material 124 in the layer 136, as shown in FIG. 6c. As illustrated in FIG. 6c, the fusing agent 138 may be dispensed from an inkjet printhead 106a. While a single printhead is shown in FIG. 6c, it is to be understood that multiple printheads may be used that span the width of the fabrication bed 130. The printhead 106a may be attached to a moving XY stage or a translational carriage (neither of which is shown) that moves the printhead 106a adjacent to the fabrication bed 130 in order to deposit the fusing agent 138 in desirable area(s).

The printhead 106a may be controlled by a controller 110 to deposit the fusing agent 138 according to a pattern of a cross-section for the layer of the 3D object that is to be formed. As used herein, the cross-section of the layer of the object to be formed refers to the cross-section that is parallel to the contact surface 132. The printhead 106a selectively applies the fusing agent 138 on those portion(s) of the layer 136 that are to be fused to become the first layer of the 3D object. As an example, if the first layer is to be shaped like a cube or cylinder, the fusing agent 138 will be deposited in a square pattern or a circular pattern (from a top view), respectively, on at least a portion of the layer 136 of the sinterable material 124. In the example shown in FIG. 6c, the fusing agent 138 is deposited in a square pattern on the portion 140 of the layer 136 and not on the portions 142.

Examples of suitable fusing agents 138 are water-based dispersions including a radiation absorbing binding agent (i.e., an active material). The active agent may be an infrared light absorber, a near infrared light absorber, or a visible light absorber. As one example, the fusing agent 138 may be an ink-type formulation including carbon black as the active material. An example of this ink-type formulation is commercially known as CM997A available from Hewlett-Packard Company. Examples of inks including visible light enhancers as the active agent are dye based colored ink and pigment based colored ink. Examples of pigment based inks include the commercially available inks CM993A and CE042A, available from Hewlett-Packard Company.

The aqueous nature of the fusing agent 138 enables the fusing agent 138 to penetrate, at least partially, into the layer 136 of the sinterable material 124. The sinterable material 124 may be hydrophobic, and the presence of a co-solvent and/or a surfactant in the fusing agent 138 may assist in obtaining desirable wetting behavior. In some examples a single fusing agent 138 may be selectively applied to form the layer of a 3D object, while in other examples multiple fusing agents 138 may be selectively applied to form the layer of the 3D object.

Figure 6D:
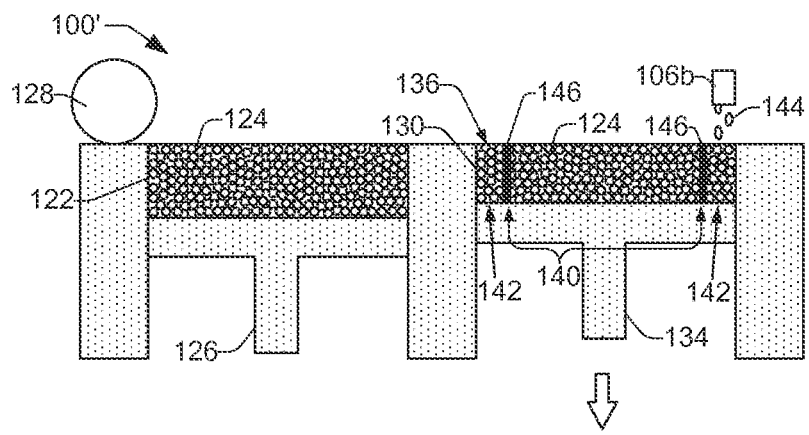

After the fusing agent 138 is/are selectively applied on the desired portion(s) 140, a detailing agent 144 can be selectively applied on the same and/or on different portion(s) of the sinterable material 124. An example of the selective application of the detailing agent 144 is schematically shown in FIG. 6d, where reference numeral 142 represents the portions of the sinterable material 124 to which the detailing agent 144 is selectively applied.

The detailing agent 144 includes an inorganic salt, a surfactant, a co-solvent, a humectant, a biocide, and water. In some examples, the detailing agent 144 comprises of these components, and no other components. It has been found that this particular combination of components effectively reduces or prevents coalescence bleed, in part because of the presence of the inorganic salt.

The inorganic salt used in the detailing agent 144 has a relatively high heat capacity, but a relatively low heat emissivity. These characteristics enable the detailing agent 144 to absorb the applied radiation (and its associated thermal energy), and to retain a bulk of the thermal energy. As such, very little, if any, of the thermal energy is transferred from the detailing agent 144 to the sinterable material 124 with which it is in contact. In addition, the inorganic salt may also have a lower thermal conductivity and/or a higher melting point than the thermal conductivity and/or melting point of the sinterable material 124 and, in some instances, of the active material in the fusing agent 138. Upon absorbing radiation and thermal energy, the inorganic salt does not melt, and also does not transfer a sufficient amount of heat to the surrounding sinterable material 124. Therefore, the detailing agent 144 can effectively reduce curing of the sinterable material 124 when the sintering material 124 is in contact with both the fusing agent 138 and the detailing agent 144, and prevent curing of the sinterable material 124 when the sintering material 124 is in contact with the detailing agent 144 alone.

The inorganic salt is water soluble. Examples of suitable water soluble inorganic salts include sodium iodide, sodium chloride, sodium bromide, sodium hydroxide, sodium sulfate, sodium carbonate, sodium phosphate, potassium iodide, potassium chloride, potassium bromide, potassium hydroxide, potassium sulfate, potassium carbonate, potassium phosphate, magnesium iodide, magnesium chloride, magnesium bromide, magnesium phosphate, and combinations thereof. The inorganic salt may be present in an amount ranging from about 5.0 wt % to about 50 wt % with respect to a total weight of the detailing agent 144.

The detailing agent 144 also includes the surfactant. The type and amount of surfactant may be selected so that a contact angle Θ with a contact line of the sinterable material 124 is less than 45°. The contact angle Θ of less than 45° ensures that the detailing agent 144 will sufficiently wet the sinterable material 124. The components of the detailing agent 144 may be mixed together, and then the amount of surfactant may be adjusted to achieve the desirable contact angle. It has been found that a suitable amount of surfactant to achieve the desired contact angle Θ may range from about 0.1 wt % to about 10 wt % with respect to the total weight of the detailing agent 144. Examples of suitable surfactants include tetraethylene glycol, liponic ethylene glycol 1 (LEG-1), a selfemulsifiable, nonionic wetting agent based on acetylenic diol chemistry (e.g., SURFYNOL® SEF from Air Products and Chemicals, Inc.), a nonionic fluorosurfactants (e.g., CAPSTONE® fluorosurfactants from DuPont, previously known as ZONYL FSO), and combinations thereof.

As noted above, the detailing agent 144 also includes the co-solvent, the humectant, and the biocide. The co-solvent is present in an amount ranging from about 1.0 wt % to about 20 wt %, the humectant is present in an amount ranging from about 0.1 wt % to about 15 wt %, and the biocide is present in an amount ranging from about 0.01 wt % to about 5 wt %, each of which is with respect to the total weight of the detailing agent 144. Suitable co-solvents include 2-hydroxyethyl-2-pyrollidinone, 2-pyrollidinone, 1,6-hexanediol, and combinations thereof. Examples of suitable humectants include Di-(2-hydroxyethyl)-5,5-dimethylhydantoin (e.g., DANTOCOL® DHF from Lonza, Inc.), propylene glycol, hexylene glycol, butylene glycol, glyceryl triacetate, vinyl alcohol, neoagarobiose, glycerol, sorbitol, xylitol, maltitol, polydextrose, quillaia, glycerin, 2-methyl-1,3-propanediol, and combinations thereof. Examples of suitable biocides include an aqueous solution of 1,2-benzisothiazolin-3-one (e.g., PROXEL® GXL from Arch Chemicals, Inc.), quaternary ammonium compounds (e.g., BARDAC® 2250 and 2280, BARQUAT® 50-65B, and CARBOQUAT® 250-T, all from Lonza Ltd. Corp.), and an aqueous solution of methylisothiazolone (e.g., KORDEK® MLX from The Dow Chemical Co.).

The balance of the detailing agent 144 is water. As such, the amount of water may vary depending upon the amounts of inorganic salt, surfactant, co-solvent, humectant, and biocide that are included.

The detailing agent 144 may be selectively applied in a manner similar to the fusing agent 138. In an example, the detailing agent 144 may be applied at the same time that the fusing agent 138 is dispensed, using a single pass or using multiple passes. In another example, the detailing agent 144 may be applied after the fusing agent 138 is dispensed. As depicted in FIG. 6d, the detailing agent 144 may be dispensed from an inkjet printhead 106b. While a single printhead is shown in FIG. 6d, it is to be understood that multiple printheads may be used that span the width of the fabrication bed 130. The printhead 106b may be attached to a moving XY stage or a translational carriage (neither of which is shown) that moves the printhead 106b adjacent to the fabrication bed 130 in order to deposit the detailing agent 144 in desirable area(s). The printhead 106b may be controlled to deposit the detailing agent 144 in the desired portion(s), such as portion(s) 140 and/or 142.

In an example, it may be desirable to enhance, refine, smooth, etc. the edge(s) of the layer of the 3D object that is being formed. In this example, the fusing agent 138 may be selectively applied according to the pattern of the cross-section (which is parallel to the contact surface 132) for the layer of the 3D object, and the detailing agent 144 may be selectively applied along at least part of an edge boundary 146 of that cross-section, as shown in FIG. 6d (side cross-sectional view of the system 100'). In the example shown, the shape of the 3D object layer to be formed is a rectangular prism, and the pattern of the cross-section that is parallel to the contact surface 132 is a square or rectangle having edge boundary 146. The sinterable material 124 within the edge boundary 146 is the portion 140 upon which the fusing agent 138 is selectively applied. The sinterable material 124 positioned between the edge boundary 146 and the edges of the fabrication bed 130 is outside the pattern of the cross-section, and thus is the portion 142 upon which the detailing agent 144 is selectively applied.

In general, the detailing agent 144 is capable of preventing curing (fusing, sintering, etc.) of the portion 142 of the sinterable material 124, while the fusing agent 138 is capable of enhancing curing (fusing, sintering, etc.) of the portion 140 of the sinterable material 124. In some examples it may be desirable to obtain different levels of curing/fusing/sintering within the layer of the 3D object that is being formed. Different levels of curing/fusing/sintering may be desirable to control internal stress distribution, warpage, mechanical strength performance, and/or elongation performance of the 3D object. In such examples, the fusing agent 138 may be selectively applied according to the pattern of the cross-section (which is parallel to the contact surface 132) for the layer of the 3D object, and the detailing agent 144 may be selectively applied within at least a portion of that cross-section. As such, the detailing agent 144 is applied to all or some of the portion 140 of the sinterable material 124 upon which the fusing agent 138 is applied. As an example, the detailing agent 144 may be applied at or near the center of the portion 140 of the sinterable material 124 and may not be applied near the edge boundary 146 of the portion 140 of the sinterable material 124. This type of application may be desirable when the edges of the layer to be formed are to be mechanically stronger than the interior of the layer. In this example, the detailing agent 144 is capable of reducing the level of curing (fusing, sintering, etc.) at the center of the portion 140 of the sinterable material 124. Since the fusing agent 138 is present in the portion 140 with the detailing agent 144, curing is not completely prevented. It is to be understood that when the detailing agent 144 is applied within the same portion 140 as the fusing agent 138, the detailing agent 144 may be applied in any desirable pattern.

In still another example, it may be desirable to enhance, refine, smooth, etc. the edge(s) of the layer of the 3D object that is being formed and to obtain different levels of curing/fusing/sintering within the layer of the 3D object that is being formed. In this example, the fusing agent 138 may be selectively applied according to the pattern of the cross-section (which is parallel to the contact surface 132) for the layer of the 3D object, and the detailing agent 144 may be selectively applied along/outside of at least part of an edge boundary 146 of that cross-section (i.e., in portion 142) and may be selectively applied within at least a portion of that cross-section (i.e., in portion 140).

As the layers of the 3D object are built up in the Z-direction, uniformity or variations in curing/fusing/sintering may be achieved along the XY plane and/or along the Z axis. Substantially uniform curing/fusing/sintering may be achieved by applying the fusing agent 138 within the cross-section of the pattern for each layer and applying the detailing agent 144 outside of the edge boundary 146 of each layer at the same voxel density. In one example, variations in curing/fusing/sintering within the cross-section of the layers may be achieved by applying the fusing agent 138 at the same voxel density in each layer, and also applying the detailing agent 144 throughout the cross-sections of each of the respective layers at different voxel densities. As an example, if it is desirable that level of curing/fusing/sintering decrease from layer to layer along the Z axis, the voxel density of the detailing agent 144 deposited within the respective cross-sections may be the lowest in the first layer and may be increased in subsequently formed layers.

Figure 6E:
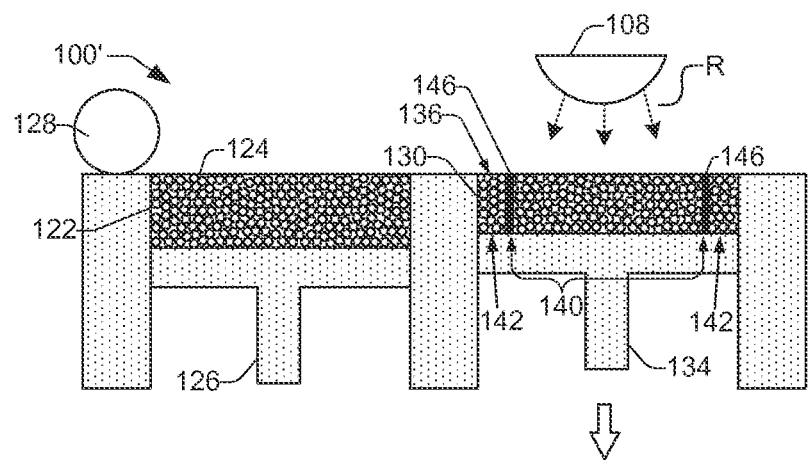

After the fusing agent 138 and the detailing agent 144 are selectively applied in the desired portions 140 and/or 142, the entire layer 136 of the sinterable material 124 is exposed to radiation R emitted from radiation source 108, as shown in FIG. 6e. In some examples, as noted above with reference to FIGS. 1-5, the layer of sinterable material 124 can be exposed to radiation R after the fusing agent 138 has been applied, but without having applied the detailing agent 144. Furthermore, as noted above, the sinterable material layer can be exposed to radiation in a pre-fusing operation for a first duration of time, and then again during a fusing operation for a second duration of time. For example, in a pre-fusing operation, the radiation source 108 (e.g., heating lamp) can be swept across the sinterable material at a first speed (e.g., for a fast exposure), followed by a fusing operation where the radiation source 108 is swept across the sinterable material at a second speed (e.g., for a slow exposure).

Radiation source 108 may emit radiation R such as IR, near-IR, UV, or visible curing lamp, IR, near-IR, UV, or visible light emitting diodes (LED), or lasers with specific wavelengths. The radiation source 108 used will depend, at least in part, on the type of fusing agent 138 that is used. The radiation source 108 may be attached, for example, to a carriage that also holds the printhead(s) 106a, 106b. The carriage may move the radiation source 108 into a position that is adjacent to the fabrication bed 130. The radiation source 108 may be controlled to expose the layer 136, including the fusing agent 138 and detailing agent 144, to radiation R. The length of time the radiation R is applied, or the energy exposure time, may depend for example, on one or more of: characteristics of the radiation source 108; characteristics of the sinterable material 124; and/or characteristics of the fusing agent 138.

The fusing agent 138 enhances the absorption of the radiation R, converts the absorbed radiation to thermal energy, and promotes the transfer of the thermal heat to the sinterable material 124 with which it is in contact (i.e., in the portion 140). In an example, the fusing agent 138 sufficiently elevates the temperature of the sinterable material 124 in the portion 140 above the melting point(s), allowing curing (e.g., sintering, binding, fusing, etc.) of the particles of sinterable material 124.

When the detailing agent 144 is applied with the fusing agent 138 in at least part of the portion(s) 140, different curing levels may be achieved. In this example, the presence of the detailing agent 144 may cause the fusing agent 138 to heat the sinterable material 124 to a temperature that is below its melting point but that is suitable to cause softening and bonding of the particles of sinterable material 124. Furthermore, portions 142 of the sinterable material 124 that do not have the fusing agent 138 applied thereto but do have the detailing agent 144 applied thereto do absorb energy. However, the detailing agent 144 modifying does not emit the absorbed energy to the adjacent sinterable material 124. Therefore, in these instances the sinterable material particles 124 within the portion(s) 142 generally do not exceed the melting point and do not cure.

Figure 6F:
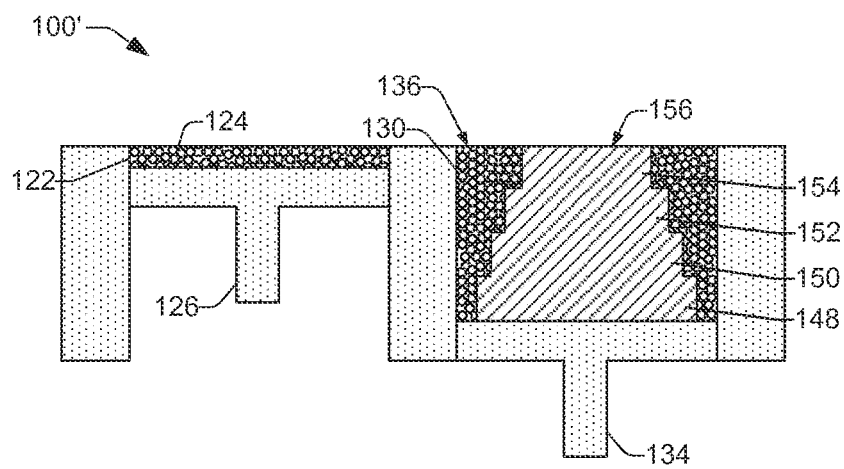

Exposure to radiation R forms one layer 148 of the 3D object 156 to be formed, as shown in FIG. 6f. The operations described above with respect to FIGS. 6a-6f can be repeated to create subsequent layers, such as layers 150, 152, and 154 (FIG. 6f), and to ultimately form the 3D object 156. During the application of radiation energy, heat absorbed from a portion of the sinterable material 124 on which fusing agent 138 has been delivered or has penetrated may propagate to a previously solidified layer, such as layer 148, causing at least some of that layer to heat up above its melting point. This effect helps create strong interlayer bonding between adjacent layers of the 3D object 156. FIG. 6*f* illustrates one example of the 3D object 156. However, an infinite variety of 3D objects is possible through variations in the shapes, sizes, and thicknesses of the layers (e.g., layers 148, 150, 152, 154) forming the 3D object.

As illustrated in FIG. 6*f*, as layers 148, 150, 152, and 154 are formed, the delivery piston 126 is pushed closer to the opening of the delivery bed 122, and the supply of the sinterable material 124 in the delivery bed 122 is diminished (compared, for example, to the supply in FIG. 6*a*). The fabrication piston 134 is pushed further away from the opening of the fabrication bed 130 in order to accommodate the subsequent layer(s) of sinterable material 124, the selectively applied fusing agent 138, and the selectively applied detailing agent 144. Since at least some of the sinterable material 124 remains uncured after each layer 148, 150, 152, and 154 is formed, the 3D object 156 is at least partially surrounded by the uncured sinterable material 124 and detailing agent 144 in the fabrication bed 130. When the 3D object 156 is complete, it may be removed from the fabrication bed 130, and the uncured sinterable material 124 and detailing agent 144 may be separated from one another. In an example, a water treatment (e.g., dissolution of the detailing agent, filtration, etc.) may be used to remove the detailing agent 144 from the sinterable material 124. The uncured sinterable material 124 may be washed and then reused.

What is claimed is:

1. A method of three-dimensional (3D) printing comprising:
    applying a sinterable material;
    selectively applying a fusing agent on a portion of the sinterable material;
    applying a first amount of radiation energy to the portion of the sinterable material to pre-heat the portion of the sinterable material to a temperature at least as high as a temperature of surrounding sinterable material but below a melting point; and
    applying a second amount of radiation energy to the portion of the sinterable material to further heat the portion of the sinterable material to a temperature that fuses the portion of the sinterable material, the second amount of radiation energy being higher than the first amount of radiation energy.

2. A method as in claim 1, wherein:
    applying a first amount of radiation energy comprises sweeping a heating lamp across the portion of the sinterable material at a first speed; and
    applying a second amount of radiation energy comprises sweeping the heating lamp across the portion of the sinterable material at a second speed different than the first speed.

3. A method as in claim 2, wherein sweeping the heating lamp across the portion of the sinterable material at a second speed comprises sweeping the heating lamp across the portion of the sinterable material at a slower speed than the first speed.

4. A method as in claim 2, wherein sweeping the heating lamp across the portion of the sinterable material at a first speed comprises sweeping the heating lamp across the portion of the sinterable material at a speed between 15 inches per second and 20 inches per second.

5. A method as in claim 2, wherein sweeping the heating lamp across the portion of the sinterable material at a second speed comprises sweeping the heating lamp across the portion of the sinterable material at a speed between 5 inches per second and 15 inches per second.

6. A method as in claim 1, further comprising selectively applying a detailing agent on the portion, on an other portion, or on both the portion and the other portion of the sinterable material.

7. A method as in claim 1, further comprising heating the sinterable material before applying the fusing agent.

8. A method as in claim 7, wherein heating the sinterable material comprises heating the sinterable material to a temperature ranging from about 50° C. to about 400° C.

9. A system for three-dimensional (3D) printing comprising:
    a support for sinterable material;
    a sinterable material distributor to provide a layer of sinterable material on the support;
    a fusing agent distributor to selectively deliver a fusing agent onto a portion of the layer of sinterable material; and
    a pre-fusing/fusing module to control a radiation source to apply a first amount of radiation energy to pre-heat the layer of sinterable material to a temperature that is below a melting point of the sinterable material during a first pre-fusing operation and to apply a second amount of radiation energy to further heat the layer of sinterable material to a temperature that fuses a portion of the layer of sinterable material during a fusing stage, the second amount of radiation energy being higher than the first amount of radiation energy.

10. A system as in claim 9, further comprising:
    a detailing agent distributor to selectively deliver a detailing agent onto the portion of the layer of the sinterable material; and
    an imaging module to control the fusing agent distributor to deposit the fusing agent according to an image pattern of a cross-section of a 3D object for the layer of sinterable material and to control the detailing agent distributor to deposit the detailing agent according to a detail pattern for the layer of sinterable material.

11. A system as in claim 10, wherein the fusing agent distributor comprises a first array of nozzles of a printhead, and wherein the detailing agent distributor comprises a second array of nozzles of the printhead.

12. A non-transitory machine-readable storage medium storing instructions that when executed by a processor of a three-dimensional (3D) printing device, cause the 3D printing device to:
    deposit a sinterable material onto a fabrication bed to form a 3D object layer;
    heat the sinterable material to a temperature ranging from about 50° C. to about 400° C.;
    deposit a fusing agent onto a portion of the sinterable material according to an image pattern of a cross-section of the 3D object layer;
    expose the sinterable material to radiation for a first duration in a pre-fusing stage to pre-heat the sinterable material to a temperature below a melting point of the sinterable material; and
    expose the sinterable material to radiation for a second duration in a fusing stage, wherein the second duration is longer than the first duration and the radiation from exposure for the second duration is greater than the radiation from exposure for the first duration.

13. A medium as in claim 12, wherein depositing a fusing agent comprises depositing a colored fusing agent whose color is selected from the group consisting of cyan, magenta, yellow, or combinations thereof.

14. A medium as in claim 12, wherein the instructions further cause the 3D printing device to deposit a detailing agent on the portion, on another portion, or on both the portion and the another portion of the sinterable material.

15. A medium as in claim 12, wherein the instructions further cause the 3D printing device to repeat the spreading a sinterable material into a fabrication bed, the heating the sinterable material, the depositing a fusing agent, the exposing the sinterable material to radiation for a first duration, and the exposing the sinterable material to radiation for a second duration, to form subsequent object layers of a 3D object.

\* \* \* \* \*